United States Patent
Quinlan et al.

(10) Patent No.: US 12,323,425 B2
(45) Date of Patent: Jun. 3, 2025

(54) TWO-FACTOR AUTHENTICATION FOR A SHARED DEVICE

(71) Applicant: BlackBerry Limited, Waterloo (CA)

(72) Inventors: Sean Michael Quinlan, Duvall, WA (US); Mendel Elliot Spencer, Ottawa (CA)

(73) Assignee: BlackBerry Limited, Waterloo (CA)

( * ) Notice: Subject to any disclaimer, the term of this patent is extended or adjusted under 35 U.S.C. 154(b) by 268 days.

(21) Appl. No.: 18/301,379

(22) Filed: Apr. 17, 2023

(65) Prior Publication Data

US 2024/0348605 A1    Oct. 17, 2024

(51) Int. Cl.
*H04L 9/40* (2022.01)

(52) U.S. Cl.
CPC ...... *H04L 63/0876* (2013.01); *H04L 63/0807* (2013.01); *H04L 63/102* (2013.01); *H04L 2463/082* (2013.01)

(58) Field of Classification Search
CPC ............... H04L 9/3213; H04L 63/0807; H04L 63/0815; H04L 63/0853; H04L 63/0876; H04L 63/102; H04L 63/08; H04L 63/107; H04L 63/10; H04L 63/123; H04L 63/205; H04L 2463/082; G06F 21/31; H04W 12/03
See application file for complete search history.

(56) References Cited

U.S. PATENT DOCUMENTS

| | | | | |
|---|---|---|---|---|
| 2007/0234408 A1* | 10/2007 | Burch | ..................... | G06F 21/31 |
| | | | | 726/6 |
| 2016/0087957 A1* | 3/2016 | Shah | ..................... | H04L 63/205 |
| | | | | 726/1 |
| 2021/0084024 A1* | 3/2021 | Sadayoshi | ........... | H04L 63/0807 |
| 2021/0099874 A1* | 4/2021 | Suraparaju | ............ | H04W 12/03 |
| 2021/0194883 A1* | 6/2021 | Badhwar | ............... | H04L 63/107 |
| 2022/0014517 A1* | 1/2022 | Jain | ..................... | H04L 63/0807 |
| 2023/0139491 A1* | 5/2023 | Paul | ....................... | H04L 63/08 |
| | | | | 726/1 |
| 2023/0388285 A1* | 11/2023 | Mehra | ..................... | H04L 63/10 |
| 2024/0031363 A1* | 1/2024 | Poovappa | ............. | H04L 63/123 |

OTHER PUBLICATIONS

Denniss et al., "Oauth 2.0 for native apps" Internet Engineering Task Force, Request for Comments 8252, Oct. 2017, 21 pages.
Hardt, "The oauth 2.0 authorization framework." Internet Engineering Task Force, Request for Comments 6749, Oct. 2012, 76 pages.
(Continued)

*Primary Examiner* — Le H Luu
(74) *Attorney, Agent, or Firm* — Fish & Richardson P.C.

(57) ABSTRACT

Systems, methods, and software can be used to perform a two-factor authentication. In some aspects, a method includes: receiving, by an electronic device from a device authentication server, a two-factor authentication (2FA) token; transmitting, by the electronic device to an identity provider (IDP), an authentication request for a 2FA operation, wherein the authentication request comprises the 2FA token; receiving, by the electronic device from the IDP, an authentication response; and determining, by the electronic device, whether the 2FA operation succeeds based on the authentication response.

20 Claims, 5 Drawing Sheets

(56) References Cited

OTHER PUBLICATIONS

Learn.microsoft.com [online], "Get started with WebView2 in Win32 apps" Mar. 2023, retrieved on Jul. 17, 2023, retrieved from URL <https://learn.microsoft.com/en-us/microsoft-edge/webview2/get-started/win32#step-4---navigation-events>, 26 pages.

Learn.microsoft.com [online], "Introduction to Microsoft Edge Web View2" Jun. 2023, retrieved on Jul. 17, 2023, retrieved from URL <https://learn.microsoft.com/en-us/microsoft-edge/webview2/>, 4 pages.

Lodderstedt et al., "OAuth 2.0 threat model and security considerations" Internet Engineering Task Force, Request for Comments 6819, Jan. 2013, 71 pages.

Openid.net [online], "OpenID Connect Core 1.0 incorporating errata set 1" Nov. 2022, retrieved on Jul. 17, 2023, retrieved from URL <https://openid.net/specs/openid-connect-core-1_0.html>, 86 pages.

* cited by examiner

TWO-FACTOR AUTHENTICATION FOR A SHARED DEVICE

TECHNICAL FIELD

The present disclosure relates to managing two-factor authentication for a shared device.

BACKGROUND

In some implementations, two-factor authentication (2FA) can be used to authenticate the identity of a user. For example, the 2FA may include a push notification. The push notification is sent to a different device. The push notification can indicate that an attempt for access is detected and requests the user to confirm that the attempt is made by the user. The user can confirm by providing a user input on the different device, e.g., selecting a button that represents "confirm", "accept", "approve", "yes", or other confirmation selection. The user can also disconfirm by providing a user input on a different device that would deny the attempt. Such an 2FA operation reduces management complexity, e.g., by not requiring a hardware key or a password credential and can improve security of the authentication operation.

DESCRIPTION OF DRAWINGS

Like reference numbers and designations in the various drawings indicate like elements.

DETAILED DESCRIPTION

In some cases, an electronic device, e.g., a desktop computer, can be shared among multiple users. In certain circumstances, a re-authentication may be needed to verify the identity of the user before granting the access at the initial login stage or continue to grant access during a login session. The re-authentication can be a re-entry of user credentials, e.g., password. Alternatively, 2FA may be used to re-authenticate the user. In some cases, 2FA can provide better security performance while reducing management complexity for the enterprise.

In some cases, a client application may be installed on the shared device to manage authentication operations for the shared device. The client application can be used to initiate re-authentication as discussed previously. However, it may be difficult for the client application to handle many aspects that are needed to perform 2FA. For example, the development complexity associated with adding logic and user interface support for the 2FA operation can be significant. The client application may not be upgraded in a timely manner to include these functionalities. Some 2FA protocols involve the use of service-specific Application Programming Interface (API) keys or other authentication credentials that may be difficult to securely deploy within a client application on the shared device.

In some cases, part of the 2FA activation and request-response exchange can be delegated to a remote identity provider (IDP). The IDP implements its own support for various 2FA mechanisms. For example, the IDP can support standards protocol such as OpenID connect (OIDC) and can interact with 2FA provider server using the standards protocol to activate and conduct the 2FA operation. FIGS. 1-5 and associated descriptions provide additional details of these implementations.

Techniques described herein produce one or more technical effects. For example, this approach reduces the complexity of the client application that manages the authentication on the shared device and improves the security of the operation.

Figure 1:
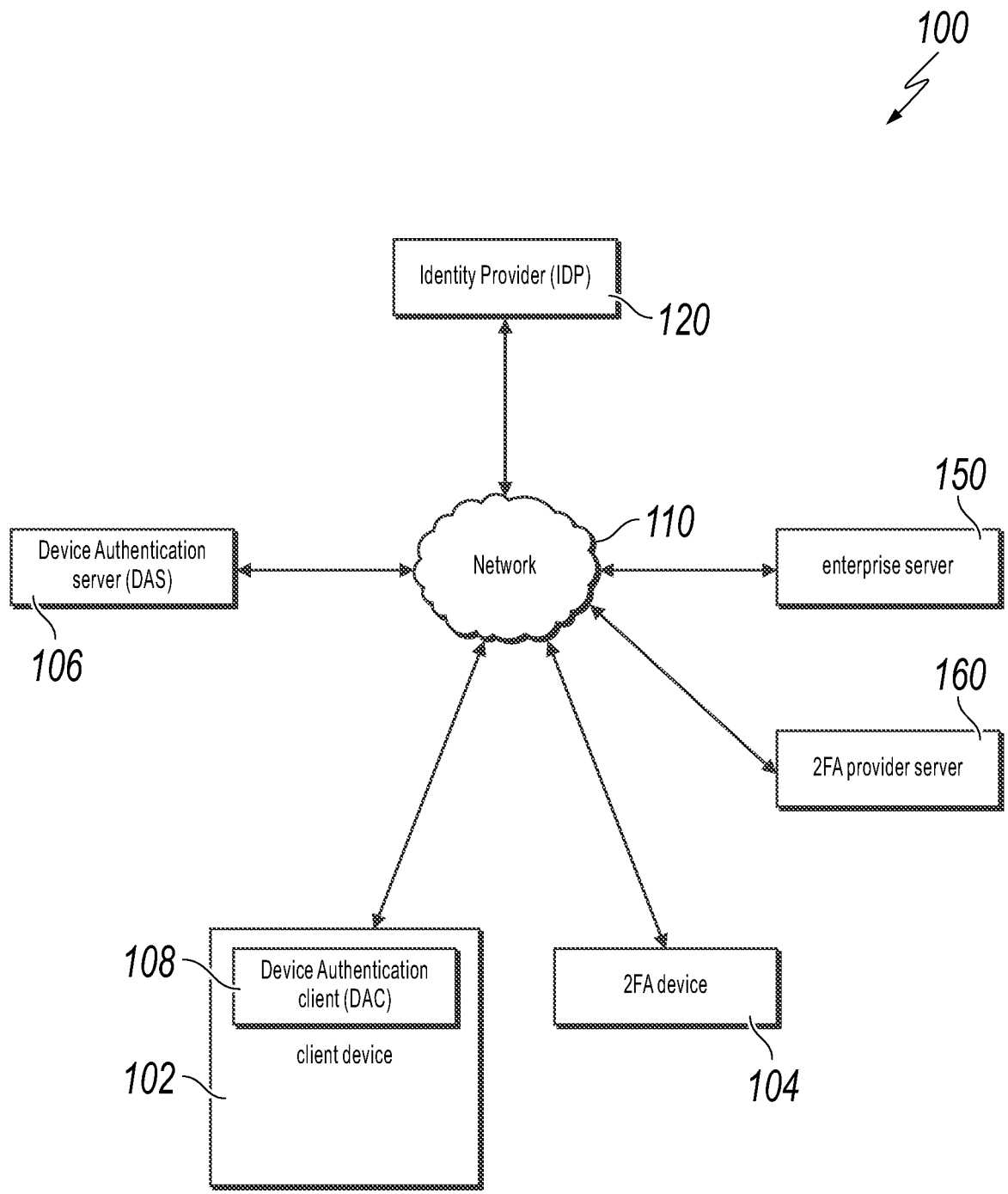
FIG. 1 is a schematic diagram showing an example system that performs a 2FA operation, according to an implementation.

FIG. 1 is a schematic diagram showing an example system 100 that performs a 2FA operation, according to an implementation. At a high level, the example system 100 includes a client device 102, a device authentication server (DAS) 106, an identity provider (IDP) 120, an enterprise server 150, a 2FA provider server 160, and a 2FA device 104 that are communicatively coupled with a network 110.

The client device 102 represents an electronic device that a user can access and use the resource on the electronic device. In some cases, the access can be shared by multiple users. In other words, more than one user can log on to the client device 102. The client device 102 can be a desktop computer. The client device 102 can also be a mobile device. Because different users can access the client device 102, the client device 102 can initiate a 2FA to authenticate the user.

In a general description, the client device 102 may include, without limitation, any of the following: endpoint, computing device, mobile device, mobile electronic device, user device, mobile station, subscriber station, portable electronic device, mobile communications device, wireless modem, wireless terminal, or another electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or another mobile communications device having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

Figure 2:
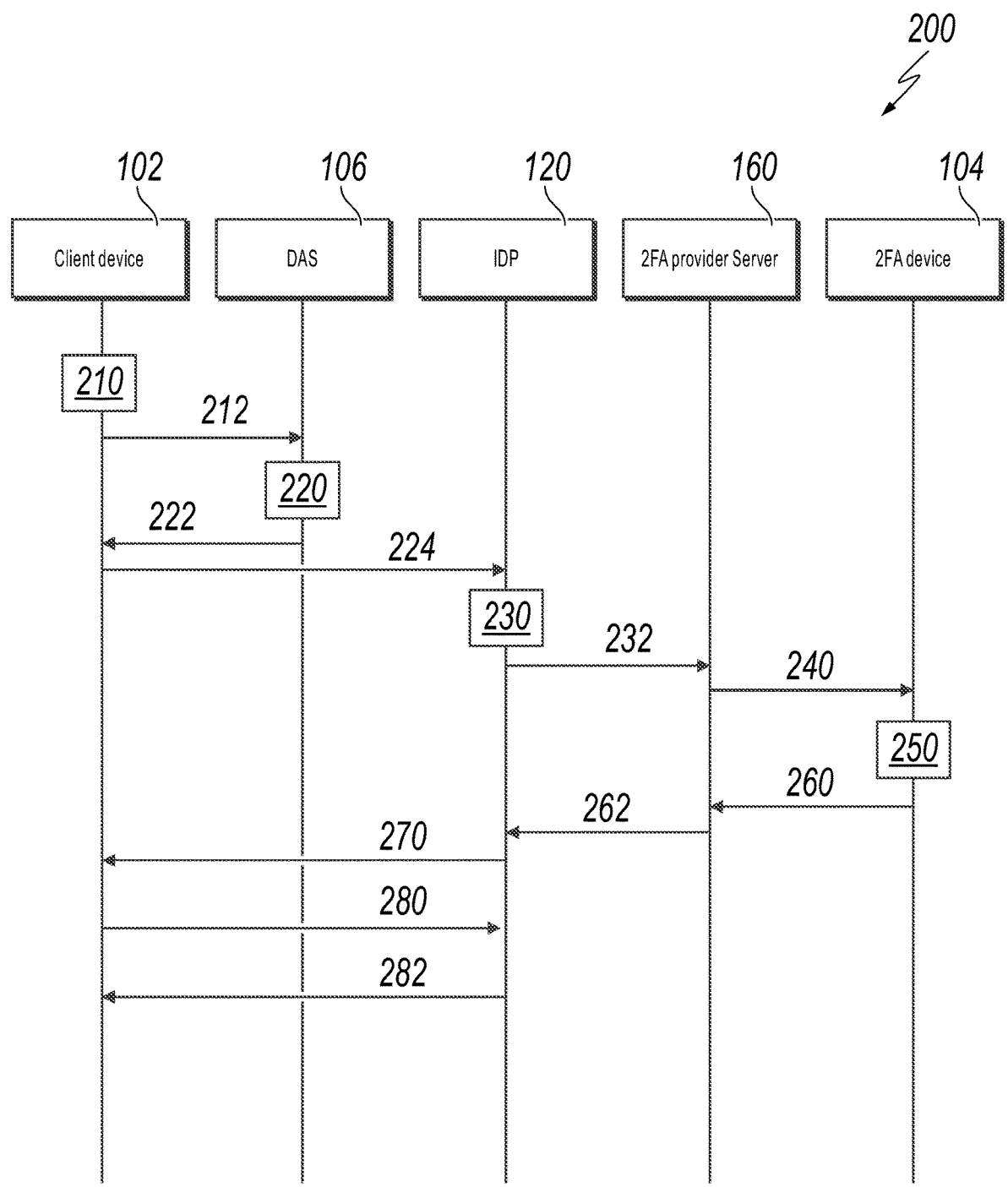
FIG. 2 is a flow diagram showing an example process of a 2FA operation, according to an implementation.
Figure 3:
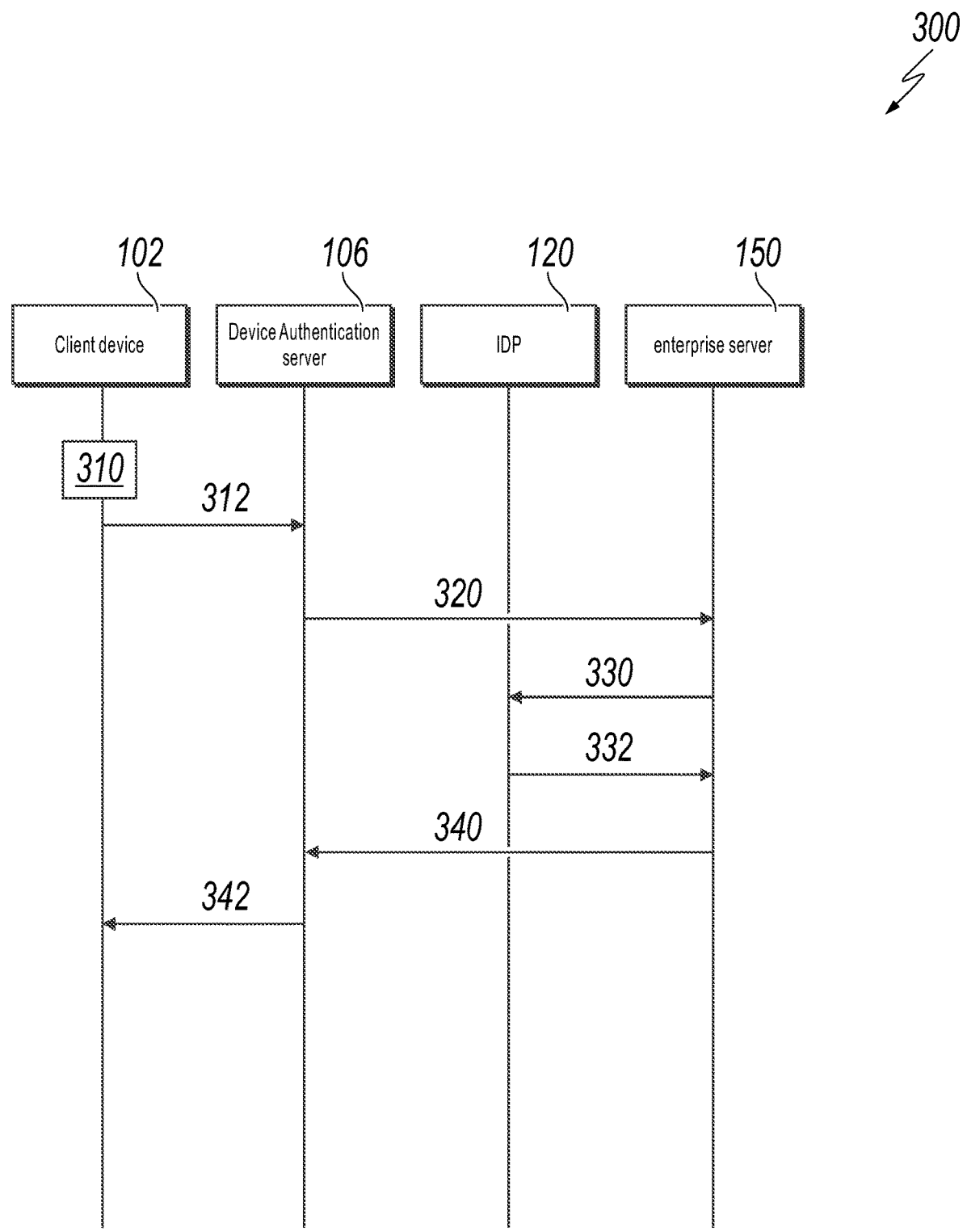
FIG. 3 is a flow diagram showing an example process of a registration operation, according to an implementation.
Figure 4:
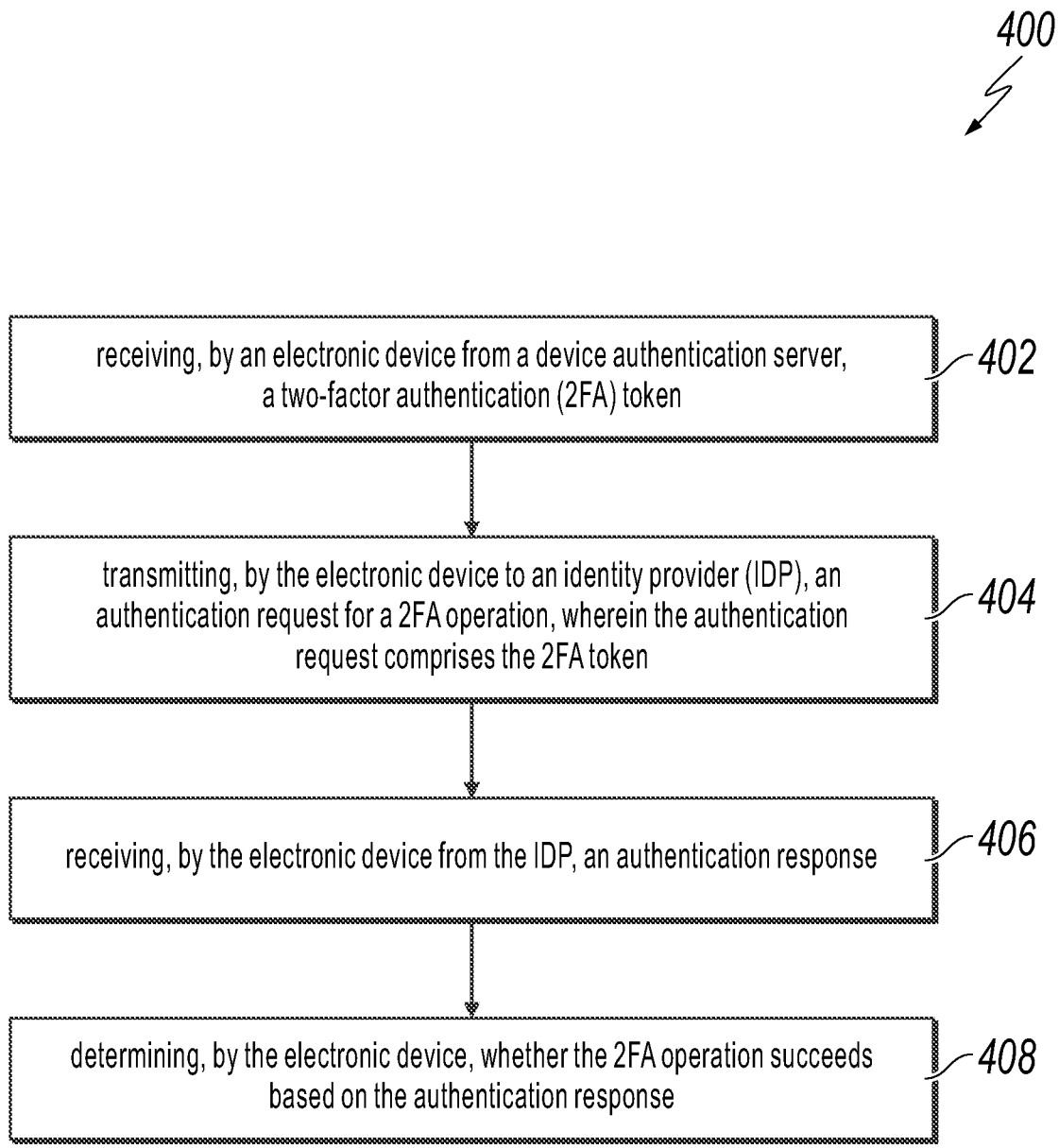
FIG. 4 is a flowchart showing an example method for an 2FA operation, according to an implementation.

In some implementations, a device authentication client (DAC) 108 can be installed and executed on the client device 102. The DAC 108 can represent an application, a set of applications, software, software modules, hardware, or any combination thereof, that can be configured to manage 2FA operation for the client device 102. For example, the DAC 108 can communicate with the DAS 106 and the IDP 120 to register a new user. The DAC 108 can also determine that 2FA is required for a user, communicate with the DAS 106 to obtain a 2FA token. The DAS 106 can communicate with the IDP 120 to provide the 2FA token and request IDP 120 to use the 2FA provider server 160 to perform the 2FA for the user. FIGS. 2-4 and associated descriptions provide additional details of these implementations.

The DAS 106 represents an application, set of applications, software, software modules, hardware, or combination thereof that can be configured to manage shared identifiers that are used in the 2FA operation. For example, the DAS 106 can generate a 2FA token that includes a shared identifier and can send the 2FA token to the client device 102. In some cases, the DAS 106 can be implemented in a cloud platform. FIGS. 2-4 and associated descriptions provide additional details of these implementations.

The IDP 120 represents an application, set of applications, software, software modules, hardware, or combination thereof that can be configured to identify an entity. In some cases, the IDP 120 can also be referred to as an identity assertion provider or an identity server. In some cases, the IDP 120 can be implemented on a cloud computing platform. The IDP 120 can validate an authentication request and request the 2FA provider server 160 to perform a 2FA. FIGS. 2-4 and associated descriptions provide additional details of these implementations.

The 2FA provider server 160 represents an application, set of applications, software, software modules, hardware, or combination thereof that can be configured to perform a 2FA operation. In some cases, the 2FA provider server 160 can push a confirmation request to the 2FA device to request certain configured input to confirm the identity of the user. In some cases, the 2FA device 104 for a particular user and the type of confirmation request for the particular user can be configured at the 2FA provider server. FIGS. 2-4 and associated descriptions provide additional details of these implementations.

The 2FA device 104 represents an application, set of applications, software, software modules, hardware, or combination thereof that can be configured to receive the push operation from the 2FA provider server 160 and receive the user input that can confirm the identity of the user. The user input can be a selection of a button or an operation, a fingerprint scan for fingerprint authentication, a configured gesture, a visual input for facial recognition, an audio input for voice recognition, or any other types of input that confirms the identity of the user. FIGS. 2-4 and associated descriptions provide additional details of these implementations.

The enterprise server 150 represents an application, a set of applications, software, software modules, hardware, or any combination thereof that can be configured to manage the user information of an enterprise that is associated with the user to be authenticated, the client device 102, or both. The enterprise server 150 can install, update, and manage the license of enterprise applications. In some cases, the enterprise server 150 can be located on the premises of the enterprise, behind a firewall, or a combination thereof. In some cases, the enterprise server 150 can be configured to provision an enterprise service in a cloud.

The example system 100 includes the network 110. The network 110 represents an application, set of applications, software, software modules, hardware, or combination thereof, that can be configured to transmit data messages between the entities in the example system 100. The network 110 can include a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

FIG. 2 is a flow diagram showing an example process 200 of a 2FA operation, according to an implementation. The process 200 can be implemented by one or more entities shown in FIG. 1, or any other systems or modules that provide authentications for a device. For example, the process 200 can be implemented by the client device 102, the DAS 106, the IDP 120, the 2FA provider server 160, the 2FA device 104, or any combinations thereof. In some cases, the operation performed by the client device 102 discussed in the process 200 can be performed by one or more applications installed on the client device 102, e.g., the DAC 108 discussed previously. The example process 200, shown in FIG. 2, can also be implemented using additional, fewer, or different operations, which can be performed in the order shown or in a different order.

The example process 200 begins at 210, where the client device 102 determines that a 2FA authentication is needed for a user. In one example operation, the client device 102 receives a user input to access the client device 102. For example, a user can attempt to access the client device 102 by using an input device coupled with the client device 102, e.g., a keypad, keyboard, touch screen, microphone, speech recognition device, and other device that can receive a user input. In some cases, the user input to access the client device 102 can be originated from a remote device, e.g., through a computer network that connects the remote device to the client device 102. In some cases, after receiving the user input, the client device 102 may request user credentials from the user to access the client device 102, e.g., username and password.

In some cases, the client device 102 can determine that the 2FA authentication is needed for the user based on configured security policy. The security policy can be configured by an organization associated with the user, the client device 102, or a combination thereof. The security policy can be installed on the client device 102. In one example, the security policy can include requirements that a 2FA is needed when a user logon for the first time in a configured duration, e.g., a day, a week, a month. Additionally or alternatively, the security policy can include requirements that a 2FA is needed when a configured duration has passed after the user logged on to the client device 102. In another example, the security policy can include requirements that a 2FA is needed if certain usage patterns are detected, e.g., the typing speed, mouse movement, or other usage pattern that are triggers the 2FA. In yet another example, the security policy can include requirements that a 2FA is needed if the user attempts to perform a security-sensitive operation on the client device 102 (e.g., using a particular software, copying or deleting or modifying a particular document) or the user attempts to use a security-sensitive resource of the client device 102 (e.g., using camera, microphone).

At 212, in response to at least determining that the 2FA authentication is needed, the client device 102 sends a 2FA request to the DAS 106. The 2FA request includes an element that identifies the user. For example, the element can be the username that the user is using to log onto the client device 102. In some cases, the 2FA request can also include an authentication credential of the client device 102 or an application on the client device 102, e.g., the DAC 108.

At 220, the DAS 106 generates a 2FA token for the user in response to receiving the 2FA request. In some cases, e.g., when the 2FA request can also include an authentication credential as discussed previously, the DAS 106 can validate the 2FA request by using the authentication credential. If the validation fails, the DAS 106 can send a 2FA response to the client device 102. The 2FA response can indicate that the authentication of the 2FA request fails. If the validation succeeds, the DAS 106 can proceed to generate the 2FA token.

For each registered user, the DAS 106 stores a matching record between a shared identifier of the user and the element that identified the user (e.g., the username) as discussed previously. The shared identifier represents the user in the IDP 120. The DAS 106 can search the matching records of shared identifiers of registered users to find the shared identifier that matches the element that identified the user (e.g., the username) received in 212. The DAS 106 can include the found shared identifier of the user in the 2FA token.

In some implementations, the 2FA token can be formatted using JavaScript Object Notation (JSON). For example, the 2FA token can include one or more JSON webtokens (JWT). The 2FA token can include a signed JWT that includes the shared identifier of the user to be authenticated. To guard against replay attacks, for the same user, the 2FA token can be different for each time that the 2FA token is requested and generated in response the 2FA request. For example, the 2FA token can have a nonce element that represents a random value that is generated for each request. In some case, the 2FA token is one JWT. An JWT identifier (jti) element of the JWT can be different for each request, and thus can be used to guard against replay attacks. In some implementations, the signed JWT can be generated by using the JOSE (JSON Object SIgning and Encryption) library and an OIDC private key of the DAS 106 to sign the JWT.

In one example, the 2FA token is a JWT that contains a subset of the elements defined in an OIDC request object. For example, the 2FA token can include one or more of the following elements: "iat", "nbf", "exp" (expiry), "jti", "iss" (issuer identifier), "aud"(audience), "client_id" (client ID), "grant_type", "response_type", "redirect_uri", "prompt", "scope", or "claims". The "claims" element includes an "id_token" element. The "id_token" element includes a sub-element that represents the shared identifier of the user.

At 222, the DAS 106 sends a 2FA response to the client device 102. The 2FA response includes the 2FA token generated by the DAS 106. In some cases, the 2FA request and 2FA response can be formatted by using a proprietary protocol between the DAS 106 and an application on the client device 102, e.g., the DAC 108.

At 224, the client device 102 sends an authentication request to the IDP 120. The authentication request indicates that a 2FA authentication is requested. The authentication request includes the 2FA token received at step 222. In some cases, the client device 102 can open a browser application on the client device 102 and use the browser application to send the authentication request. The authentication request can be formatted according to a standardized protocol, e.g., the OIDC protocol.

At 230, the IDP 120 validates the authentication request. In some cases, the IDP 120 can perform the validation according to the JWT authenticating request (JAR) procedure. In one example, the IDP 120 can validate the authentication request based on the information included in the 2FA token, e.g., the signed JWT discussed previously.

If the IDP 120 determines that the 2FA token fails the validation, the IDP 120 can stop further 2FA operation. In some cases, the IDP 120 can send an authentication response to the client device 102. The authentication response can indicate that the 2FA token in the authentication request is not valid.

If the IDP 120 determines that the 2FA token passes the validation, at 232, the IDP 120 triggers the 2FA operation that is configured by the user as identified by the shared identifier. The configuration can be set according to a policy of an organization associated with the user, with the client device 102, or a combination thereof. In one example, the IDP 120 initiates the 2FA operation by sending a 2FA request to the 2FA provider server 160.

In some cases, the 2FA request may indicate a push request. In one example, the 2FA request can include a random challenge and an identifier of the 2FA device 104. The 2FA request would trigger the 2FA device 104, through the 2FA provider server 160, to sign the challenge using a key that was previously established during a registration procedure with the IDP 120. The 2FA device 104 can return the signed challenge for validation.

After receiving the 2FA request, the 2FA provider server 160 proceeds to perform the 2FA. In some cases, the 2FA can include operations of the 2FA device 104. For example, at 240 the 2FA can include a push operation to the 2FA device 104. In one example, the confirmation request can be presented on an interface of 2FA device 104, indicating that an access request for the user has been detected and requests the user to provide an input, e.g., pressing an "accept" button, to confirm the access. Alternatively or in addition, the confirmation request can also include a visual or audio verification request, e.g., facial recognition, voice recognition or fingerprint verification request, for the user to complete the recognition process.

At 250, the user provides the requisite confirmation to the push operation. The confirmation can include user input such as pressing the "accept" button, providing fingerprint, providing facial image, providing voice annunciation, or any combinations thereof.

At 260, the 2FA device 104 can send the information provided by the user to the 2FA provider server 160. At 262, The 2FA provider server 160 can send a response to the IDP 120. The response can indicate whether the 2FA succeeds or fails based on whether the correct 2FA input has been received at the 2FA device 104.

If the 2FA succeeds, at 270, the IDP 120 can send an authentication response to the client device 102. The authentication response can indicate that the 2FA succeeded. In some cases, the authentication response can include a redirect command. The redirect command redirects the browser on the client device 102 (that was used to send the authentication request at step 224) to a redirect Uniform Resource Locator (URL). The redirect command can include an authorization code. In some cases, the authorization code can be included in the location header of the redirect command.

At 280, the client device 102 sends an id token request to the IDP 120. In some cases, the client device 102 obtains the authorization code in the redirect command and includes the authorization code in the id token request.

At 282, the client device 102 can receive an id token response from the IDP 120. The id token response includes an id token for the user. The client device 102 validates the id token by using the signature included in the id token. In some cases, the id token can be formatted according to the OIDC protocol. The id token can include one or more of the following elements: "iss"—the issuer identifier, "sub"—the user identifier, "aud"—the audience, "exp"—the expiry time, or "nonce"—a random one-time use code. In some cases, the validation includes verifying that the signature is valid. The validation also includes verifying that the issuer identifier indicated by the id token matches the issuer identifier of the IDP 120, that the audience indicated by the id token includes the client ID of the DAC 108, that the current time is before the expiry time indicated by the id token, that the nonce element in the id token matches the nonce in the id token request, or any combinations thereof.

If the id token is validated, the 2FA is completed and the client device 102 can allow the user to continue to access the client device 102.

In some cases, the 2FA may fail at any of the steps discussed previously. For example, the 2FA device 104 may fail to receive the confirmation input, the IDP 120 may fail to send an authentication response (as discussed in step 270) to the client device 102 within a configured duration, or the id token validation may fail. If the 2FA fails, the client device 102 can proceed according to the configured security policy. For example, the configured security policy can include provisions of remedial actions, such as triggering an additional 2FA operation. The additional 2FA operation may be the same as the previous 2FA operation. The additional 2FA operation may also be the different than the previous 2FA operation, e.g., using a different 2FA device, requesting a different confirmation user input, etc.

The configured security policy can also include provisions of the number of remedial actions within a configured duration, e.g., 5 re-tries can be attempted within 1 hour. If a number of remedial actions have been performed and the 2FA still fails, the client device 102 can proceed to perform response action. Different response actions can be configured in the security policy. These response actions can include requesting additional credentials, locking the client device 102 and disallowing access to this user, sending notification to an administrative device to indicate the failed 2FA for this user, and any combinations thereof.

In some implementations, when a new user first logs onto the client device 102, a registration operation can be performed. FIG. 3 is a flow diagram showing an example process 300 of a registration operation, according to an implementation. The process 300 can be implemented by one or more entities shown in FIG. 1, or any other systems or modules that provide authentications for a device. For example, the process 200 can be implemented by the client device 102, the DAS 106, the IDP 120, the enterprise server 150, or any combinations thereof. In some cases, the operation performed by the client device 102 discussed in the process 300 can be performed by one or more applications installed on the client device 102, e.g., the DAC 108 discussed previously. The example process 300, shown in FIG. 3, can also be implemented using additional, fewer, or different operations, which can be performed in the order shown or in a different order.

The example process 300 begins at 310, where the client device 102 determines that a new user is accessing the client device 102. In one example operation, the client device 102 receives a user input to access the client device 102. For example, a user can attempt to access the client device 102 by using an input device coupled with the client device 102, e.g., a keypad, keyboard, touch screen, microphone, speech recognition device, and other devices that can receive a user input. In some cases, the user input to access the client device 102 can be originated from a remote device, e.g., through a computer network that connects the remote device to the client device 102. In some cases, after receiving the user input, the client device 102 may request user credentials from the user to access the client device 102, e.g., username and password.

In some cases, when the client device 102 detects a user logging onto the client device 102, the client device 102 determines that the user is a new user. In some cases, the user can provide the user ID of the user during the log-in process. The client device 102 can search whether the user ID is included in the list of user IDs that have previously accessed the client device 102.

At 312, the client device 102 sends a registration request to the DAS 106. The registration request includes a user object representing the new user. The user object can include an element that identifies the new user, e.g., a username. The element can be the same element that will be included in step 212 discussed previously in FIG. 2. The user object can also include an authentication token of the client device 102, or an application (e.g., the DAC 108) on the client device 102 that performs the registration operation. In some implementations, the user object can also include a security identifier (SID). The SID can be used to match user records created in the system with corresponding user records in an external active directory instance that backend servers may be configured to have access to. In some implementations, the user object can also include a domain name of the user.

At 320, the DAS 106 sends a user creation request to the enterprise server 150. The user creation request includes the information in the user object received in step 312. For example, the user creation request can include the username, the domain information, and SID of the new user. In some cases, the user creation request can also include a parameter that identifies the type of user record being created for the new user. For example, the parameter can be set to active directory (AD), indicating that the new user may match a user record found in an active directory instance that the backend services may have access to.

At 330, the enterprise server 150 can send a IDP user creation request to the IDP 120 to create the user record for the new user in the IDP. The IDP user creation request can include username, the domain information, SID, or any combinations thereof. In some case, the IDP user creation request can be formatted according to a standardized protocol, e.g., System for Cross-domain Identity Management (SCIM) specification.

At 332, the IDP 120 generates a shared identifier to the user and sends the shared identifier to the enterprise server 150. The shared identifier can be a random number. In some cases, the random number can be generated with a high-entropy random number generator to make the shared identifier unique to the user. At 340, the enterprise server 150 sends the shared identifier to the DAS 106. At 342, the DAS 106 sends a registration response to the client device 102. The registration response indicates that the registration is completed.

FIG. 4 is a flowchart showing an example method 400 for an 2FA operation, according to an implementation. The example method 400 can be implemented by a client device, e.g., the client device 102 shown in FIG. 1. The example method 400 shown in FIG. 4 can be implemented using additional, fewer, or different operations, which can be performed in the order shown or in a different order.

At step 402, an electronic device receives a two-factor authentication (2FA) token from a device authentication server. At 404, the electronic device transmits an authentication request to an identity provider (IDP) for a 2FA operation, where the authentication request includes the 2FA token. At 406, the electronic device receives an authentication response from the IDP. At 408, the electronic device determines whether the 2FA operation succeeds based on the authentication response.

Figure 5:
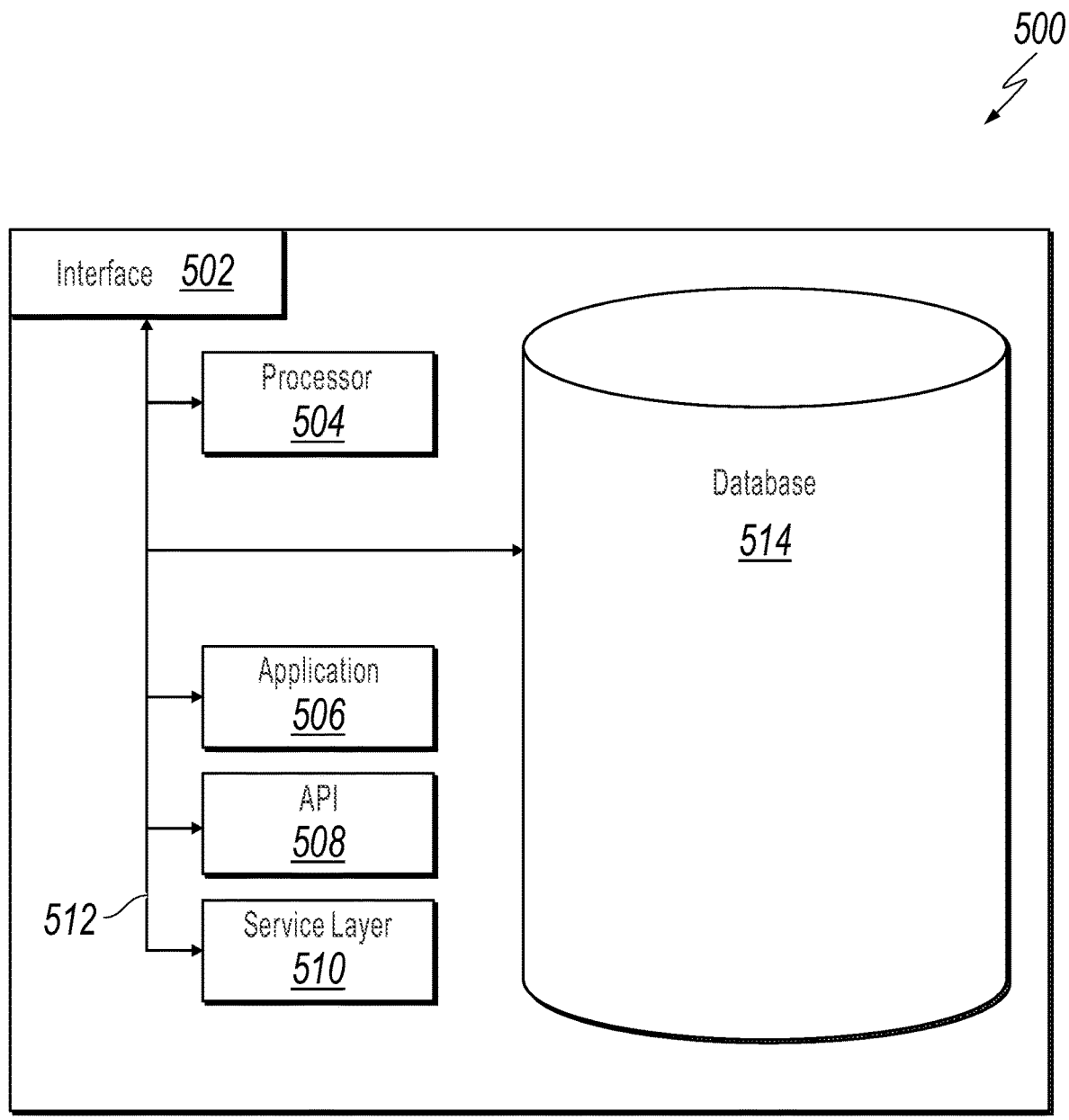
FIG. 5 illustrates a high-level architecture block diagram of a computer according to an implementation.

FIG. 5 illustrates a high-level architecture block diagram of a computer 500 according to an implementation. The computer 500 can be implemented as the client device 102, the 2FA device 104, the DAS 106, the IDP 120, the enterprise server 150, the 2FA provider server 160, or any combinations thereof. The computer 500 can also be used to implement the operations discussed in FIGS. 1-4. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

In some cases, the processing algorithm of the code package establishment can be implemented in an executable computing code, e.g., C/C++ executable codes. In some cases, the computer 500 can include a standalone Linux system that runs batch applications. In some cases, the computer 500 can include mobile or personal computers.

The computer 500 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The computer 500 can serve as a client, network component, a server, a database or other persistency, and/or any other components. In some implementations, one or more components of the computer 500 may be configured to operate within a cloud-computing-based environment.

At a high level, the computer 500 is an electronic computing device operable to receive, transmit, process, store, or manage data. According to some implementations, the computer 500 can also include or be communicably coupled with an application server, e-mail server, web server, caching server, streaming data server, business intelligence (BI) server, and/or other server.

The computer 500 can collect data of network events or mobile application usage events over network 110 from a web browser or a client application, e.g., an installed plugin. In addition, data can be collected by the computer 500 from internal users (e.g., from a command console or by another appropriate access method), external or third parties, other automated applications, as well as any other appropriate entities, individuals, systems, or computers.

Each of the components of the computer 500 can communicate using a system bus 512. In some implementations, any and/or all the components of the computer 500, both hardware and/or software, may interface with each other and/or the interface 502 over the system bus 512 using an API 508 and/or a service layer 510. The API 508 may include specifications for routines, data structures, and object classes. The API 508 may be either computer language-independent or—dependent and refer to a complete interface, a single function, or even a set of APIs. The service layer 510 provides software services to the computer 500. The functionality of the computer 500 may be accessible for all service consumers using this service layer. Software services, such as those provided by the service layer 510, provide reusable, defined business functionalities through a defined interface. For example, the interface may be software written in JAVA, C++, or other suitable languages providing data in Extensible Markup Language (XML) format or other suitable format. While illustrated as an integrated component of the computer 500, alternative implementations may illustrate the API 508 and/or the service layer 510 as stand-alone components in relation to other components of the computer 500. Moreover, any or all parts of the API 508 and/or the service layer 510 may be implemented as child or sub-modules of another software module, enterprise application, or hardware module without departing from the scope of this disclosure.

The computer 500 includes an interface 502. Although illustrated as a single interface 502 in FIG. 5, two or more interfaces 502 may be used according to particular needs, desires, or particular implementations of the computer 500. The interface 502 is used by the computer 500 for communicating with other systems in a distributed environment connected to a network (whether illustrated or not). Generally, the interface 502 comprises logic encoded in software and/or hardware in a suitable combination and operable to communicate with the network. More specifically, the interface 502 may comprise software supporting one or more communication protocols associated with communications such that the network or interface's hardware is operable to communicate physical signals within and outside of the computer 500.

The computer 500 includes at least one processor 504. Although illustrated as a single processor 504 in FIG. 5, two or more processors may be used according to particular needs, desires, or particular implementations of the computer. Generally, the processor 504 executes instructions and manipulates data to perform the operations of the computer 500. Specifically, the processor 504 executes the functionality disclosed in FIGS. 1-4.

The computer 500 also includes a memory 514 that holds data for the computer 500. Although illustrated as a single memory 514 in FIG. 5, two or more memories may be used according to particular needs, desires, or particular implementations of the computer 500. While memory 514 is illustrated as an integral component of the computer 500, in alternative implementations, memory 514 can be external to the computer 500.

The application 506 is an algorithmic software engine providing functionality according to particular needs, desires, or particular implementations of the computer 500, particularly with respect to functionality required for anomaly detection. Although illustrated as a single application 506, the application 506 may be implemented as multiple applications 506 on the computer 500. In addition, although illustrated as integral to the computer 500, in alternative implementations, the application 506 can be external to the computer 500.

There may be any number of computers 500 associated with, or external to, and communicating over a network. Furthermore, this disclosure contemplates that many users may use one computer 500, or that one user may use multiple computers 500.

Described implementations of the subject matter can include one or more features, alone or in combination.

For example, in a first implementation, a method, comprising: receiving, by an electronic device from a device authentication server, a two-factor authentication (2FA) token; transmitting, by the electronic device to an identity provider (IDP), an authentication request for a 2FA operation, wherein the authentication request comprises the 2FA token; receiving, by the electronic device from the IDP, an authentication response; and determining, by the electronic device, whether the 2FA operation succeeds based on the authentication response.

The foregoing and other described implementations can each, optionally, include one or more of the following features:

A first feature, combinable with any of the following features, wherein the method further comprises: prior to receiving the 2FA token: determining, by the electronic device, that a 2FA is needed: in response to at least determining that the 2FA is needed, transmitting a 2FA request to the device authentication server, wherein the 2FA request comprises an authentication token of the electronic device; and wherein the 2FA token is received in response to the 2FA request.

A second feature, combinable with any of the previous or following features, wherein the authentication request is formatted according to a standardized protocol.

A third feature, combinable with any of the previous or following features, wherein the method further comprises: prior to receiving the 2FA token: receiving, by the electronic device, a login request of a new user; generating, by the electronic device, a user object representing the new user, wherein the user object comprises an authentication token of the electronic device; and transmitting, by the electronic device to the device authentication server, a registration request for a user, wherein the registration request comprises the user object.

A fourth feature, combinable with any of the previous or following features, wherein the 2FA token comprises a JavaScript Object Notation (JSON) web token (JWT).

A fifth feature, combinable with any of the previous or following features, wherein the 2FA token comprises a shared identifier of a user to be authenticated.

A six feature, combinable with any of the previous features, wherein the authentication response further comprises a redirect command.

In a second implementation, a computer-readable medium containing instructions which, when executed, cause an electronic device to perform operations comprising: receiving, by the electronic device from a device authentication server, a two-factor authentication (2FA) token; transmitting, by the electronic device to an identity provider (IDP), an authentication request for a 2FA operation, wherein the authentication request comprises the 2FA token; receiving, by the electronic device from the IDP, an authentication response; and determining, by the electronic device, whether the 2FA operation succeeds based on the authentication response.

The foregoing and other described implementations can each, optionally, include one or more of the following features:

A first feature, combinable with any of the following features, wherein the operations further comprise: prior to receiving the 2FA token: determining, by the electronic device, that a 2FA is needed: in response to at least determining that the 2FA is needed, transmitting a 2FA request to the device authentication server, wherein the 2FA request comprises an authentication token of the electronic device; and wherein the 2FA token is received in response to the 2FA request.

A second feature, combinable with any of the previous or following features, wherein the authentication request is formatted according to a standardized protocol.

A third feature, combinable with any of the previous or following features, wherein the operations further comprise: prior to receiving the 2FA token: receiving, by the electronic device, a login request of a new user; generating, by the electronic device, a user object representing the new user, wherein the user object comprises an authentication token of the electronic device; and transmitting, by the electronic device to the device authentication server, a registration request for a user, wherein the registration request comprises the user object.

A fourth feature, combinable with any of the previous or following features, wherein the 2FA token comprises a JavaScript Object Notation (JSON) web token (JWT).

A fifth feature, combinable with any of the previous or following features, wherein the 2FA token comprises a shared identifier of a user to be authenticated.

A six feature, combinable with any of the previous features, wherein the authentication response further comprises a redirect command.

In a third implementation, an electronic device comprises: one or more processors; and one or more computer memory devices interoperably coupled with the one or more processors and having tangible, non-transitory, machine-readable media storing one or more instructions that, when executed by the one or more processors, cause the electronic device to perform operations comprising: receiving, by the electronic device from a device authentication server, a two-factor authentication (2FA) token; transmitting, by the electronic device to an identity provider (IDP), an authentication request for a 2FA operation, wherein the authentication request comprises the 2FA token; receiving, by the electronic device from the IDP, an authentication response; and determining, by the electronic device, whether the 2FA operation succeeds based on the authentication response.

The foregoing and other described implementations can each, optionally, include one or more of the following features:

A first feature, combinable with any of the following features, wherein the operations further comprise: prior to receiving the 2FA token: determining, by the electronic device, that a 2FA is needed: in response to at least determining that the 2FA is needed, transmitting a 2FA request to the device authentication server, wherein the 2FA request comprises an authentication token of the electronic device; and wherein the 2FA token is received in response to the 2FA request.

A second feature, combinable with any of the previous or following features, wherein the authentication request is formatted according to a standardized protocol.

A third feature, combinable with any of the previous or following features, wherein the operations further comprise: prior to receiving the 2FA token: receiving, by the electronic device, a login request of a new user; generating, by the electronic device, a user object representing the new user, wherein the user object comprises an authentication token of the electronic device; and transmitting, by the electronic device to the device authentication server, a registration request for a user, wherein the registration request comprises the user object.

A fourth feature, combinable with any of the previous or following features, wherein the 2FA token comprises a JavaScript Object Notation (JSON) web token (JWT).

A fifth feature, combinable with any of the previous or following features, wherein the 2FA token comprises a shared identifier of a user to be authenticated.

A six feature, combinable with any of the previous features, wherein the authentication response further comprises a redirect command.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM or a RAM or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a WLAN using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

The invention claimed is:

1. A method, comprising:
   receiving, by an electronic device from a device authentication server, a two-factor authentication (2FA) token;
   transmitting, by the electronic device to an identity provider (IDP), an authentication request for a 2FA operation, wherein the authentication request comprises the 2FA token;
   receiving, by the electronic device from the IDP, an authentication response; and
   determining, by the electronic device, whether the 2FA operation succeeds based on the authentication response.

2. The method of claim 1, further comprising:
   prior to receiving the 2FA token:
      determining, by the electronic device, that a 2FA is needed:
      in response to at least determining that the 2FA is needed, transmitting a 2FA request to the device authentication server, wherein the 2FA request comprises an authentication token of the electronic device; and
   wherein the 2FA token is received in response to the 2FA request.

3. The method of claim 1, wherein the authentication request is formatted according to a standardized protocol.

4. The method of claim 1, further comprising:
   prior to receiving the 2FA token:
      receiving, by the electronic device, a login request of a new user;
      generating, by the electronic device, a user object representing the new user, wherein the user object comprises an authentication token of the electronic device; and
      transmitting, by the electronic device to the device authentication server, a registration request for a user, wherein the registration request comprises the user object.

5. The method of claim 1, wherein the 2FA token comprises a JavaScript Object Notation (JSON) web token (JWT).

6. The method of claim 1, wherein the 2FA token comprises a shared identifier of a user to be authenticated.

7. The method of claim 1, wherein the authentication response further comprises a redirect command.

8. A non-transitory computer-readable medium containing instructions which, when executed, cause an electronic device to perform operations comprising:
   receiving, by the electronic device from a device authentication server, a two-factor authentication (2FA) token;
   transmitting, by the electronic device to an identity provider (IDP), an authentication request for a 2FA operation, wherein the authentication request comprises the 2FA token;
   receiving, by the electronic device from the IDP, an authentication response; and
   determining, by the electronic device, whether the 2FA operation succeeds based on the authentication response.

9. The non-transitory computer-readable medium of claim 8, the operations further comprising:
   prior to receiving the 2FA token:
      determining, by the electronic device, that a 2FA is needed:
      in response to at least determining that the 2FA is needed, transmitting a 2FA request to the device authentication server, wherein the 2FA request comprises an authentication token of the electronic device; and
   wherein the 2FA token is received in response to the 2FA request.

10. The non-transitory computer-readable medium of claim 8, wherein the authentication request is formatted according to a standardized protocol.

11. The non-transitory computer-readable medium of claim 8, the operations further comprising:
    prior to receiving the 2FA token:
       receiving, by the electronic device, a login request of a new user;
       generating, by the electronic device, a user object representing the new user, wherein the user object comprises an authentication token of the electronic device; and
       transmitting, by the electronic device to the device authentication server, a registration request for a user, wherein the registration request comprises the user object.

12. The non-transitory computer-readable medium of claim 8, wherein the 2FA token comprises a JavaScript Object Notation (JSON) web token (JWT).

13. The non-transitory computer-readable medium of claim 8, wherein the 2FA token comprises a shared identifier of a user to be authenticated.

14. The non-transitory computer-readable medium of claim 8, wherein the authentication response further comprises a redirect command.

15. An electronic device, comprising:
    one or more processors; and
    one or more computer memory devices interoperably coupled with the one or more processors and having tangible, non-transitory, machine-readable media storing one or more instructions that, when executed by the one or more processors, cause the electronic device to perform operations comprising:
       receiving, by the electronic device from a device authentication server, a two-factor authentication (2FA) token;
       transmitting, by the electronic device to an identity provider (IDP), an authentication request for a 2FA operation, wherein the authentication request comprises the 2FA token;
       receiving, by the electronic device from the IDP, an authentication response; and
       determining, by the electronic device, whether the 2FA operation succeeds based on the authentication response.

16. The electronic device of claim 15, the operations further comprising:
    prior to receiving the 2FA token:
       determining, by the electronic device, that a 2FA is needed:
       in response to at least determining that the 2FA is needed, transmitting a 2FA request to the device authentication server, wherein the 2FA request comprises an authentication token of the electronic device; and
    wherein the 2FA token is received in response to the 2FA request.

17. The electronic device of claim 15, wherein the authentication request is formatted according to a standardized protocol.

18. The electronic device of claim 15, the operations further comprising:
- prior to receiving the 2FA token:
    - receiving, by the electronic device, a login request of a new user;
    - generating, by the electronic device, a user object representing the new user, wherein the user object comprises an authentication token of the electronic device; and
    - transmitting, by the electronic device to the device authentication server, a registration request for a user, wherein the registration request comprises the user object.

19. The electronic device of claim 15, wherein the 2FA token comprises a JavaScript Object Notation (JSON) web token (JWT).

20. The electronic device of claim 15, wherein the 2FA token comprises a shared identifier of a user to be authenticated.

* * * * *